US011888246B2

(12) United States Patent
Bradstreet et al.

(10) Patent No.: US 11,888,246 B2
(45) Date of Patent: Jan. 30, 2024

(54) WIDEBAND MONOPOLE ANTENNA

(71) Applicant: SRC, Inc., North Syracuse, NY (US)

(72) Inventors: Lance M. Bradstreet, Clay, NY (US); Gregory J. Kliss, Syracuse, NY (US); Russell W. Striffler, Marietta, NY (US)

(73) Assignee: SRC, Inc., North Syracuse, NY (US)

( * ) Notice: Subject to any disclaimer, the term of this patent is extended or adjusted under 35 U.S.C. 154(b) by 39 days.

(21) Appl. No.: 17/515,797

(22) Filed: Nov. 1, 2021

(65) Prior Publication Data

US 2023/0138687 A1 May 4, 2023

(51) Int. Cl.

*H01Q 9/40* (2006.01)
*H01Q 1/48* (2006.01)
*H01Q 5/25* (2015.01)

(52) U.S. Cl.

CPC ................. *H01Q 9/40* (2013.01); *H01Q 1/48* (2013.01); *H01Q 5/25* (2015.01)

(58) Field of Classification Search

CPC .. H01Q 9/30; H01Q 9/32; H01Q 9/34; H01Q 9/36; H01Q 9/38; H01Q 9/40; H01Q 5/25; H01Q 1/48

See application file for complete search history.

(56) References Cited

U.S. PATENT DOCUMENTS

| | | | | |
|---|---|---|---|---|
| 11,611,370 B2 * | 3/2023 | Scherz | H01Q 21/10 |
| 2007/0146224 A1 * | 6/2007 | Pintos | H01Q 9/40 343/786 |
| 2019/0356053 A1 * | 11/2019 | Lin | H01Q 1/38 |

FOREIGN PATENT DOCUMENTS

| | | | |
|---|---|---|---|
| CN | 108899638 A | 11/2018 |
| GB | 529152 A | 11/1940 |

OTHER PUBLICATIONS

Combined Search and Examination Report, App. No. GB2216017.0, dated Apr. 26, 2023, pp. 1-2.

* cited by examiner

*Primary Examiner* — Daniel Munoz
(74) *Attorney, Agent, or Firm* — Jonathan Gray

(57) ABSTRACT

A monopole antenna, comprising: a radiating element, wherein the radiating element has a first curved outer surface that is rotationally symmetric about a longitudinal axis extending through the monopole antenna, wherein a first diameter at a first end of the radiating element is less than a second diameter at a second end of the radiating element; and a ground plane disposed opposite the radiating element such that an electric field is generated by the radiating element with a ground plane providing the counterpoise, wherein the ground plane has a second curved outer surface that is rotationally symmetric about the longitudinal axis, wherein a first diameter at a first end of the ground plane is less than a second at a second end of the ground plane, wherein the first end of the radiating element is disposed adjacent the first end of the ground plane.

12 Claims, 7 Drawing Sheets

WIDEBAND MONOPOLE ANTENNA

FIELD OF INVENTION

This application is generally related to wideband monopole antennas, and, more particularly, to wideband monopole antennas having curved outer surfaces.

BACKGROUND

Monopole antennas are radio antennas widely used in both transmit and receive contexts. Typically, monopole antennas are fabricated as straight rods positioned perpendicular to, and electrically referenced to, a flat, often circular, ground plane. This geometry—a straight rod arranged perpendicular to a flat ground plane—offers a consistent and symmetric pattern across azimuth but has a bandwidth that is limited to approximately 10%. At higher frequencies, the pattern can start to mode, resulting in radiation in undesired directions and nulls in desired directions. There is, then, a need in the art for very wide bandwidth monopole antennas that also maintain well behaved, rotationally symmetric patterns throughout the band of interest.

SUMMARY

All examples and features mentioned below can be combined in any technically possible way.

According to an aspect, a monopole antenna includes: a radiating element, wherein the radiating element has a first curved outer surface that is rotationally symmetric about a longitudinal axis extending through the monopole antenna, wherein a first diameter at a first end of the radiating element is less than a second diameter at a second end of the radiating element; and a ground plane disposed opposite the radiating element such that an electric field is generated by the radiating element using the ground plane as a counterpoise, wherein the ground plane has a second curved outer surface that is rotationally symmetric about the longitudinal axis, wherein a first diameter at a first end of the ground plane is less than a second at a second end of the ground plane, wherein the first end of the radiating element is disposed adjacent the first end of the ground plane.

In an example, at least a part of the first curved outer surface is substantially defined by a truncated circular paraboloid.

In an example, at least a part of the first curved outer surface is substantially defined by a truncated hyperboloid.

In an example, at least a part of the first curved outer surface is substantially defined by a truncated circular paraboloid joined to the truncated hyperboloid.

In an example, at least a part of the second curved outer surface is substantially defined by a truncated circular paraboloid.

In an example, the monopole antenna, during operation, has a VSWR of at least 3:1 over a predetermined bandwidth.

In an example, the first curved outer surface is defined, across height, by a first polynomial existing between an inner boundary and an outer boundary, wherein the inner boundary is defined by a second polynomial having the coefficients:

[−3.3697*e*+05,1.2311*e*+05,−1.6052*e*+04,846.7565, −17.8756,1.1249,−0.0091], wherein the outer boundary is defined a third polynomial having the coefficients:

[−3.3697*e*+05,1.2311*e*+05,−1.6052*e*+04,846.7565, −17.8756,1.1249,0.0062]

wherein the predetermined bandwidth is at least 350-6,000 MHz.

In an example, the first polynomial has the coefficients:

[−3.3697*e*+05,1.2311*e*+05,−1.6052*e*+04,846.7565, −17.8756,1.1249,0.0024].

In an example, the second curved outer surface is defined, across height, by a fourth polynomial existing between a second inner boundary and a second outer boundary, wherein the second inner boundary is defined by a fifth polynomial having the coefficients:

[−1.6988*e*+05,6.8727*e*+04,−1.0044*e*+04,626.0154, −16.5014,−0.1925,0.0096], wherein the second outer boundary is defined a sixth polynomial having the coefficients:

[5.6431*e*+04,−6.3725*e*+04,1.9482*e*+04,−2.6004*e*+03, 166.6723,−5.4307,0.0656].

In an example, the fourth polynomial has the coefficients:

[−1.6988*e*+05,7.2610*e*+04,−1.1390*e*+04,789.2496, −24.5701,−0.0372,0.0100].

In an example, the first curved outer surface is defined, across height, by a first polynomial existing between an inner boundary and an outer boundary, wherein the inner boundary is defined by a second polynomial having the coefficients:

[−1.8260*e*+07,3.8143*e*+06,−2.9036*e*+05,9.2911*e*+ 03,−99.4808,0.3379,0.0052]

wherein the outer boundary is defined a third polynomial having the coefficients:

[−1.7632*e*+07,3.7703*e*+06,−2.9922*e*+05,1.0539*e*+ 04,−158.8708,1.5534,0.0075]

wherein the predetermined bandwidth is at least 750-6,000 MHz.

In an example, the first polynomial has the coefficients:

[−1.7632*e*+07,3.7703*e*+06,−2.9922*e*+05,1.0539*e*+ 04,−158.8708,1.5534,0.0011].

In an example, the second curved outer surface is defined, across height, by a fourth polynomial existing between a second inner boundary and a second outer boundary, wherein the second inner boundary is defined by a fifth polynomial having the coefficients:

[5.3043*e*+07,−1.6244*e*+07,2.0181*e*+06,−1.2998*e*+ 05,4.5683*e*+03,−83.7362,0.6242]

wherein the second outer boundary is defined a sixth polynomial having the coefficients:

[−6.0187*e*+05,−2.0001*e*+05,8.0273*e*+04,−9.2436*e*+ 03,482.7150,−12.5322,0.1321].

The monopole antenna of claim 3, wherein the fourth polynomial has the coefficients:

[−6.0187*e*+05,−2.2295*e*+05,7.3559*e*+04,−7.2884*e*+ 03,325.5185,−7.4394,0.0697].

In an example, the first curved outer surface is defined, across height, by a first polynomial existing between an inner boundary and an outer boundary, wherein the inner boundary is defined by a second polynomial having the coefficients:

[−4.93500*e*+35,6.42410*e*+34,−3.84685*e*+33, 1.40487*e*+32,−3.49753*e*+30,6.28527*e*+28, −8.42139*e*+26,8.56859*e*+24,−6.68061*e*+22, 3.99837*e*+20,−1.82823*e*+18,6.31088*e*+15, −1.61039*e*+13,2.93397*e*+10,−3.59697*e*+07, 2.65028*e*+04,−8.83888*e*+00]

wherein the outer boundary is defined a third polynomial having the coefficients:

[−4.55838e+35,5.95257e+34,−3.57632e+33, 1.31063e+32,−3.27491e+30,5.90804e+28, −7.94839e+26,8.12231e+24,−6.36156e+22, 3.82570e+20,−1.75807e+18,6.10037e+15, −1.56504e+13,2.8669e+10,−3.534904e+07, 2.61810e+04,−8.7756e+00]

wherein the predetermined bandwidth is at least 9,000-10,000 MHz.

In an example, the first polynomial has the coefficients:

[−4.55837e+35,5.95256e+34,−3.57631e+33, 1.31063e+32,−3.27491e+30,5.90803e+28, −7.94838e+26,8.12229e+24,−6.36155e+22, 3.82569e+20,−1.75806e+18,6.10036e+15, −1.56504e+13,2.86693e+10,−3.53408e+07, 2.61809e+04,−8.77787e+00].

In an example, the second curved outer surface is defined, across height, by a fourth polynomial existing between a second inner boundary and a second outer boundary, wherein the second inner boundary is defined by a fifth polynomial having the coefficients:

[−8.4064e+10,−1.7844e+09,−8.1603e+06,3.3145e+04,247.4060,−0.1378,0.0094]

wherein the second outer boundary is defined a sixth polynomial having the coefficients:

[3.1457e+11,7.6263e+09,6.7617e+07,2.6504e+05,364.4879,−0.6138,0.0115].

In an example, the fourth polynomial has the coefficients:

[−5.1635e+10,−1.5511e+09,−1.5377e+07,−6.8894e+04,−223.2867,−0.9833,0.0094].

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Applicant has recognized that a monopole antenna with a radiating element and ground plane that have curved surfaces rotationally symmetric about a longitudinal axis, can result in improved performance across azimuth for very wide bandwidths. In various examples described below, the curved surface of the monopole antenna includes a radiating element that widens along the longitudinal axis such that a diameter of the radiating element at the top of the monopole antenna is greater than the diameter at its bottom. In various examples, the radiating element substantially follows a truncated circular paraboloid. In other examples, the radiating element substantially follows a truncated hyperboloid combined with a truncated circular paraboloid. Similarly, the ground plane features a curved surface that widens along the longitudinal axis such that the diameter of the at the top of the ground plane is less than the diameter at its bottom. In various examples, the ground plane substantially follows a truncated circular hyperboloid. (Throughout this disclosure, the term "ground plane" is used to conform with the conventional name of the conductive surface positioned below the radiating element to reflect the radio waves emitted by it; as shown in the various examples, "ground plane" need not be planar.)

Figure 1A:
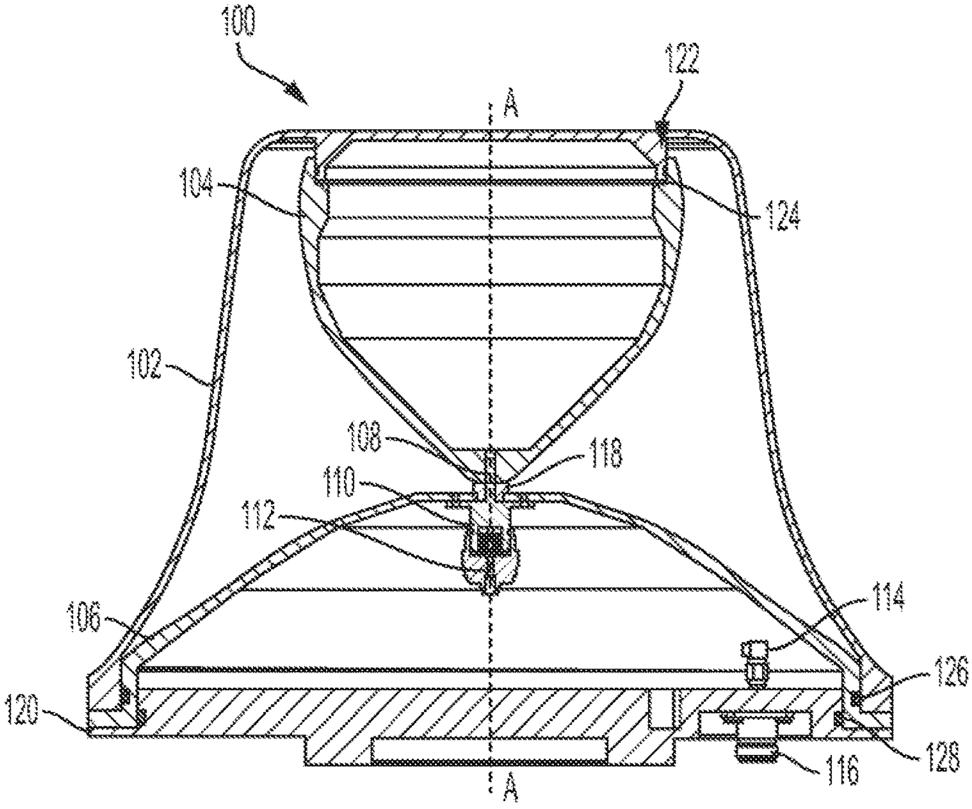
FIG. 1A depicts a cross-section view of a monopole antenna having a radiating element and a ground plane that have a rotationally symmetric curved surface, according to an example.
Figure 1B:
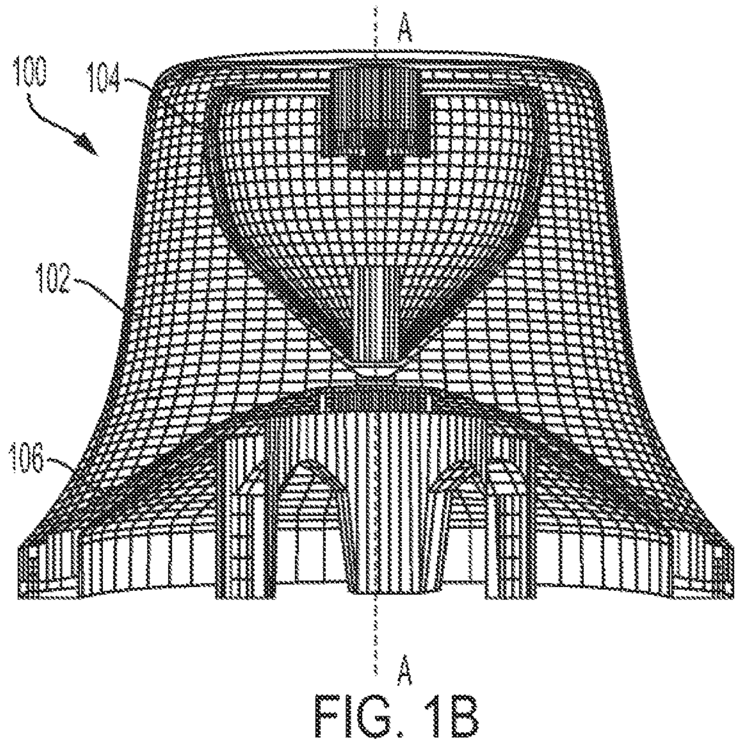
FIG. 1B depicts a three-dimensional model of the monopole antenna of FIG. 1A, having a radiating element and a ground plane that each have a rotationally symmetric curved surface, according to an example.

FIG. 1A-1B depicts a first examples of a monopole antenna featuring rotationally symmetric curved outer surfaces. More particularly, a cross-section view of a monopole antenna 100 disposed beneath a radome 102 is shown. Monopole antenna 100, as shown in the view of FIGS. 1A and 1B, comprises a radiating element 104 and a ground plane 106, each of which includes a curved surface that is rotated about a longitudinal axis A-A extending through the center (when viewed from above) of monopole antenna 100.

As described above, the curved outer surface of monopole antenna 100 is rotationally symmetric about the longitudinal axis, enabling the monopole antenna to maintain consistent patterns in azimuth, that is, to be omni-directional. More particularly, the curved outer surface of radiating element 104 widens along to the longitudinal axis to substantially follow a truncated (as the bottom, relative to the orientation of the drawing, is "cut off") circular paraboloid. (For the purposes of this disclosure, "substantially follow" or "substantially defined by" means that the outer surface deviates from a best-fit shape—e.g., truncated circular paraboloid, truncated hyperboloid—by 20% or less.) Thus, the top of the radiating element 104 has a diameter greater than its bottom. Similarly, ground plane 106 widens along the longitudinal axis to substantially follow a truncated (as the top is "cut off") circular paraboloid, such that the bottom of the ground plane 106 has a diameter greater than its top.

Figure 7:
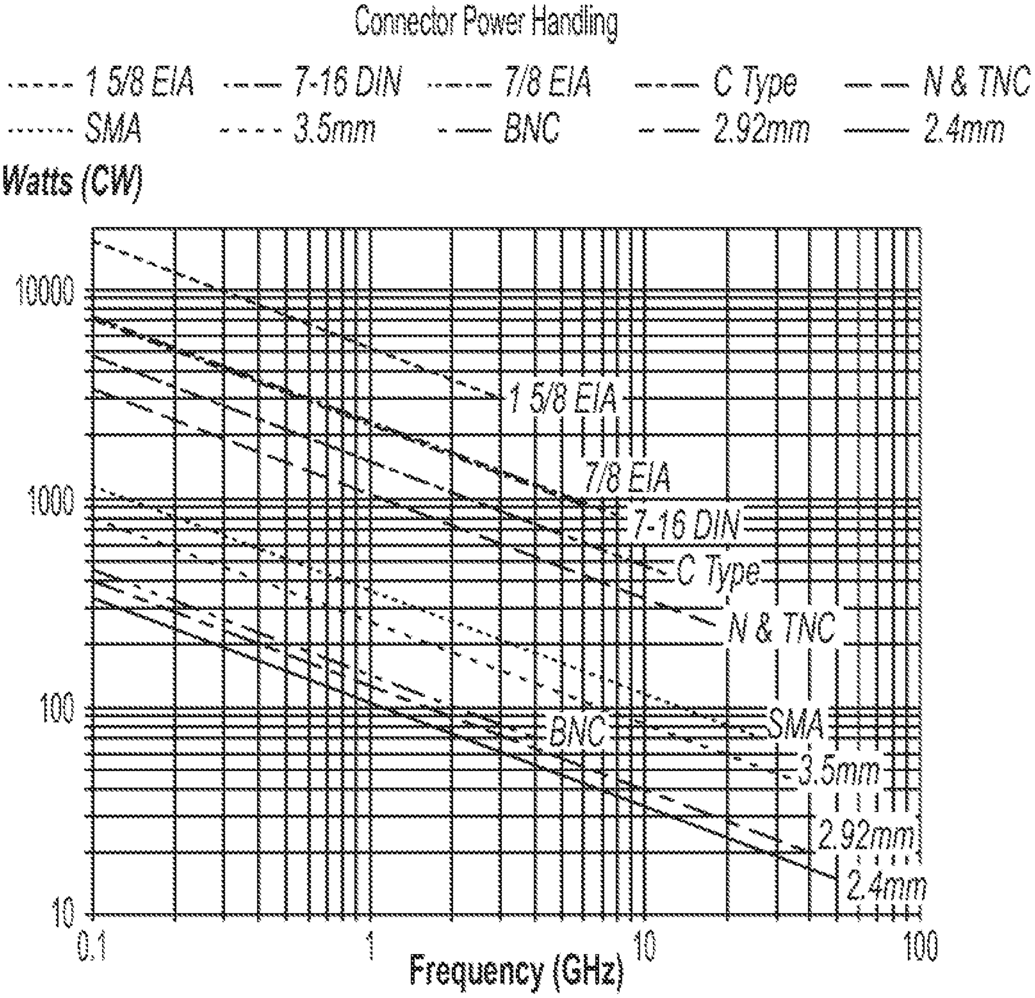
FIG. 7 depicts a plot of the power of a continuous-wave signal handled by different connectors over frequency.

Again, as a result of the shape of the outer surfaces of radiating element 104 and ground plane 106, monopole antenna 100 is omni-directional (i.e., has 360° azimuth coverage), and features elevation coverage of −10 to 50°. Further, monopole antenna 100 features a VSWR of 2:1 from 350-6,000 MHz and can transmit up to a 500 W continuous wave drive signal, dependent on the power handling of the N-type connector. In various alternative examples, as described below, other types of connectors, besides an N-type connector, can be used. Various types of connectors will handle different amounts of power over frequency. FIG. 7 depicts a plot of the power of a continuous-wave signal handled by different connectors over frequency.

Figure 2A:
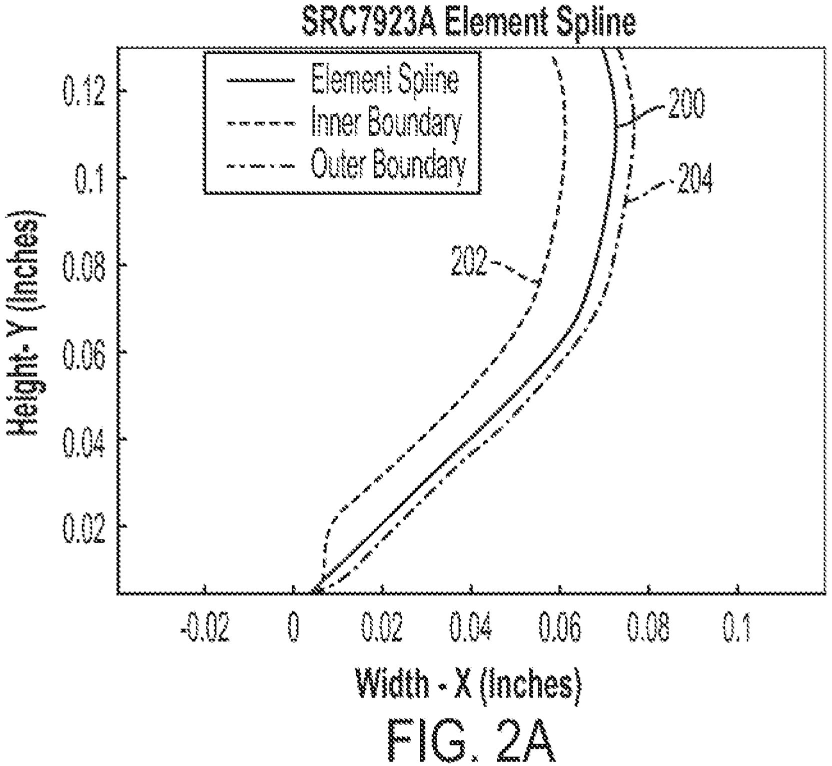
FIG. 2A depicts a plot of a range of potential curves of the radiating element, according to an example.

FIG. 2A depicts the curve 200 of the outer surface of radiating element 104. Curve 200 is rotated about the Y-axis (i.e., longitudinal axis A-A) to form the outer surface of radiating element 104 and is defined by a polynomial having the following coefficients:

[−3.3697e+05,0.2311e+05,−1.6052e+04,846.7565,−17.8756,1.12490.0024]

The above polynomial, and polynomials provided below, define the X value (width) with the Y value (height) as the input (i.e., the polynomial defines the curve across height). Thus, in pseudocode, each polynomial can be written as follows:

element_X_value=polyval(polynomial_coefficients, element_Y_value)

While curve 200 results in optimized performance in the frequency range of interest—a VSWR of 2:1 from 350-6,000 MHz—variations of curve 200 result in acceptable performance, i.e., a VSWR of at least 3:1, within the same frequency band. Generally speaking, multiple variations of curve 200 are shown in FIG. 2A, defined between inner boundary 202 and outer boundary 204. These examples, when paired with a suitably shaped ground plane (e.g., a suitable ground plane from the set of ground planes defined in connection with FIG. 2B), result in a VSWR of at least 3:1 over at least the 350-6,000 MHz bandwidth.

As shown, inner boundary can be defined by the polynomial coefficients:

[−3.3697e+05,1.2311e+05,−1.6052e+04,846.7565,−17.8756,1.1249−0.0091]

And the outer boundary coefficients can be defined by the following coefficients:

[−3.3697e+05,1.2311e+05,−1.6052e+04,846.7565,−17.8756,1.12490.0062]

It should be understood that not all alternative examples of curves of monopole antenna 100 depicted in FIG. 2A will substantially follow a truncated circular paraboloid. Indeed, the curve of inner boundary 202 substantially follows a truncated hyperboloid (at the bottom of the curve) and a truncated circular paraboloid above the truncated hyperboloid. In other words, the curve of inner boundary 202 substantially follows a truncated hyperboloid adjoined with a truncated circular paraboloid, akin to a wineglass in shape. For the purposes of this disclosure, a truncated hyperboloid is truncated to remove at least a half of the hyperboloid such that only a trunk remains that widens outward, along the longitudinal axis, at one end; rather than a hyperboloid that is not truncated, which widens at both ends. (Another example of such curved outer surface will be discussed in conjunction with FIG. 36.)

Figure 2B:
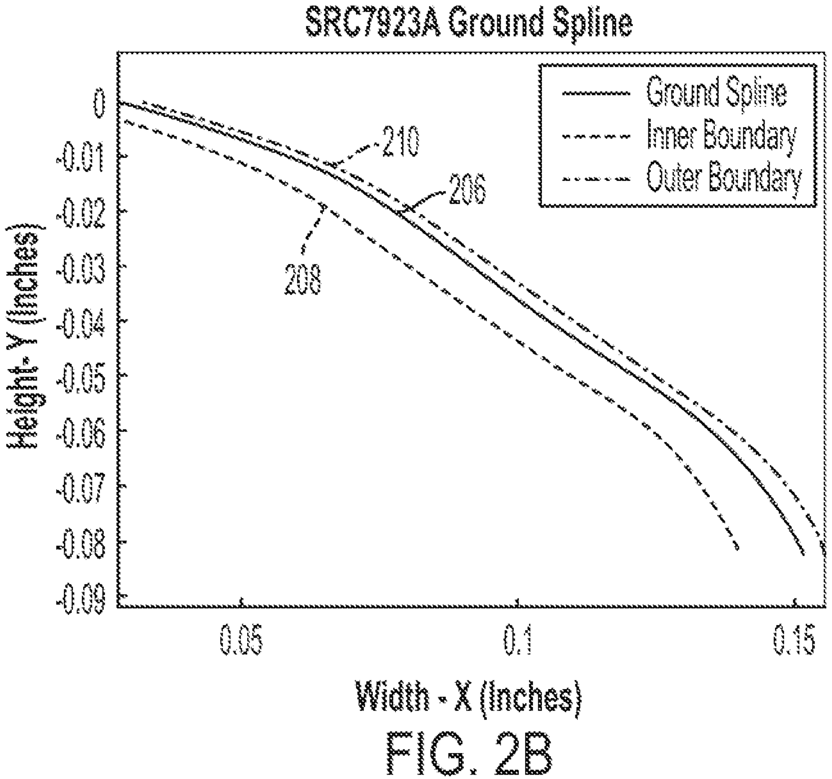
FIG. 2B depicts a plot of a range of potential curves of the ground plane, according to an example.

FIG. 2B, similar to FIG. 2A, depicts the curve 206 of the outer surface of ground plane 106. Curve 206 is rotated about the Y-axis (i.e., longitudinal axis A-A) to form the outer surface of ground plane 106 and is defined by a polynomial having the following coefficients:

[−1.6988e+05,6.8727e+04,−1.0044e+04,626.0154,−16.5014,−0.1925,0.0096]

As shown, curve 206, in various alternative examples, can be defined between inner boundary 208 and outer boundary 210. Inner boundary can be defined by the polynomial coefficients:

[5.6431e+04,−6.3725e+04,1.9482e+04,−2.6004e+03,166.6723,−5.4307,0.0656]

And the outer boundary coefficients can be defined by the following coefficients:

[−1.6988e+05,7.2610e+04,−1.1390e+04,789.2496,−24.5701,−0.0372,0.0100]

Figure 3:
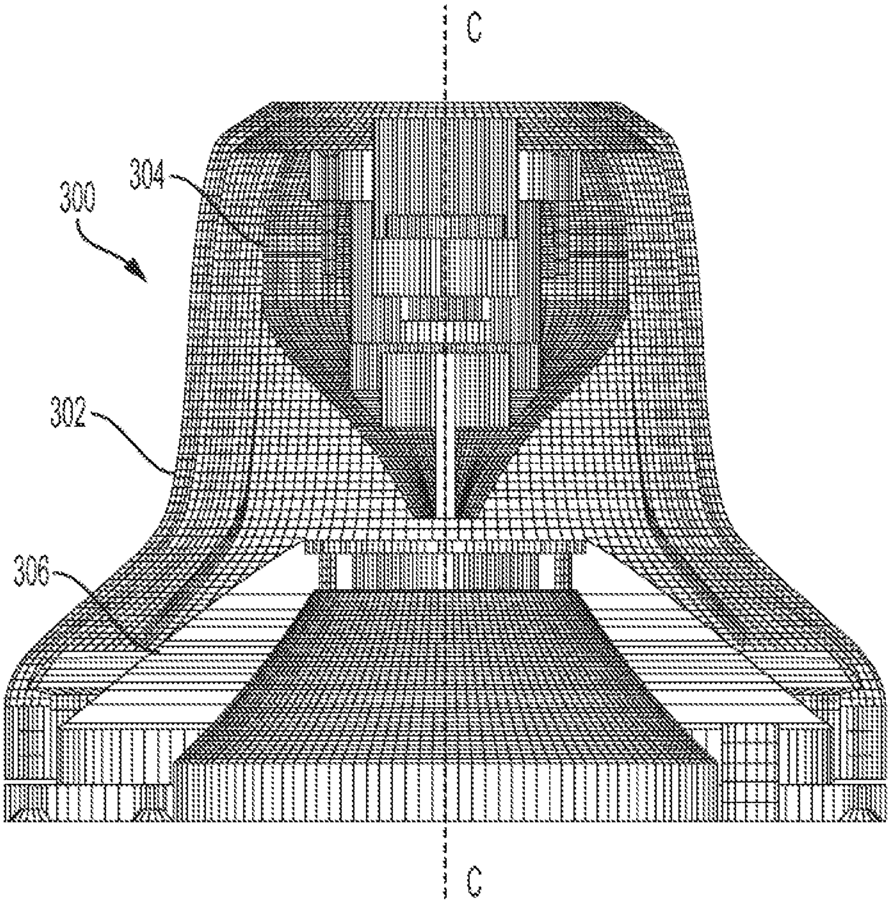
FIG. 3 depicts a three-dimensional model of a monopole antenna having a radiating element and a ground plane that each have a rotationally symmetric curved surface, according to an example.

Before moving to FIG. 3, which shows an alternative example of a monopole antenna with rotationally symmetric curved outer surfaces, the various structural features of monopole antenna 100 will be briefly discussed in connection with FIG. 1A. As shown, radiating element 104 receives a drive signal via a threaded pin extending from a flange mount N-type connector 110, disposed within ground plane 106. (In alternative examples, a press fit pin can be used—press fit pins can potentially avoid the situation where the radiating element pulls the pin out of the connector.) Flange mount N-type connector 110 is connected to an N to SMA adapter 112, which receives the drive signal from an SMA connector 114, which, in turn, is connected to a flange-mount N-type connector 116. This construction, with these connector types, is provided only as an example, and any suitable RF type connectors and/or adapters can be employed to deliver the drive signal to the radiating element.

Further, as shown in FIG. 1A, radiating element is electrically insulated from the ground plane 106 via, in this example, a Polytetrafluoroethylene (PTFE) spacer 118. Ground plane 106 is further seated on baseplate 120. In addition, radome 102 fits into a cup-shaped indentation 122 on the top of radiating element 104 and creates a seal with radiating element 104 using O-ring 124, with ground plane 160 using O-ring 126, and using baseplate 120 with O-ring 128. An alignment mechanism in the radome fits into a hole in the radiating element and compresses a spring or a compression gasket to stabilize the antenna without additional screws.

The remaining figures depict three-dimensional models of the monopole antennas, or the range potential curves for such antennas, to focus on the curves of the outer surfaces of the radiating element and the ground plane, rather than structural features such as those highlighted in FIG. 1A. It should, however, be understood that the additional examples of monopole antennas having curved outer surfaces described in this disclosure can likewise include structural elements, such as RF connectors, adapters, spacers, O-rings, etc., necessary to receive a drive signal and to operate. Further, it should be understood that, in alternative examples, any type of suitable RF connector, adapter, spacer, O-ring, etc., can be used to receive a drive signal, to insulate the radiating element from the ground plane, to seal the radome, etc.

As mentioned above, FIG. 3 shows an alternative example of a monopole antenna featuring rotationally symmetric curved outer surfaces. More particularly, a perspective view of a monopole antenna 300 disposed beneath a radome 302 is shown. Similar to monopole antenna 300, monopole antenna 300 comprises a radiating element 304 and a ground plane 306, each of which includes a curved surface that is rotated about a longitudinal axis B-B extending through the center (when viewed from above) of monopole antenna 300.

Like monopole antenna 100, the curved outer surface of monopole antenna 300 that is rotationally symmetric about the longitudinal axis enables the monopole antenna to maintain consistent patterns in azimuth, that is, to be omnidirectional. In this example, however, the curved outer surface of radiating element 304 widens along to the longitudinal axis to substantially follow a truncated hyperboloid (at the bottom) joined to a truncated circular paraboloid (at the top). The top of the radiating element 304, thus, has a diameter greater than its bottom. Similarly, ground plane 306 widens along the longitudinal axis to substantially follow a truncated circular paraboloid, such that bottom of the ground plane 306 has a diameter greater than its top.

Again, as a result of the shape of the outer surfaces of radiating element 304 and ground plane 306, monopole antenna 300 is omni-directional (i.e., has 360° azimuth coverage), and features elevation coverage of −10 to 50°. Further, monopole antenna 100 features a VSWR of 2:1 from 750-6,000 MHz and can transmit up to a 500 W continuous wave drive signal over the operating band (depending on the type of connector used, as described above in connection with FIG. 7).

Figure 4A:
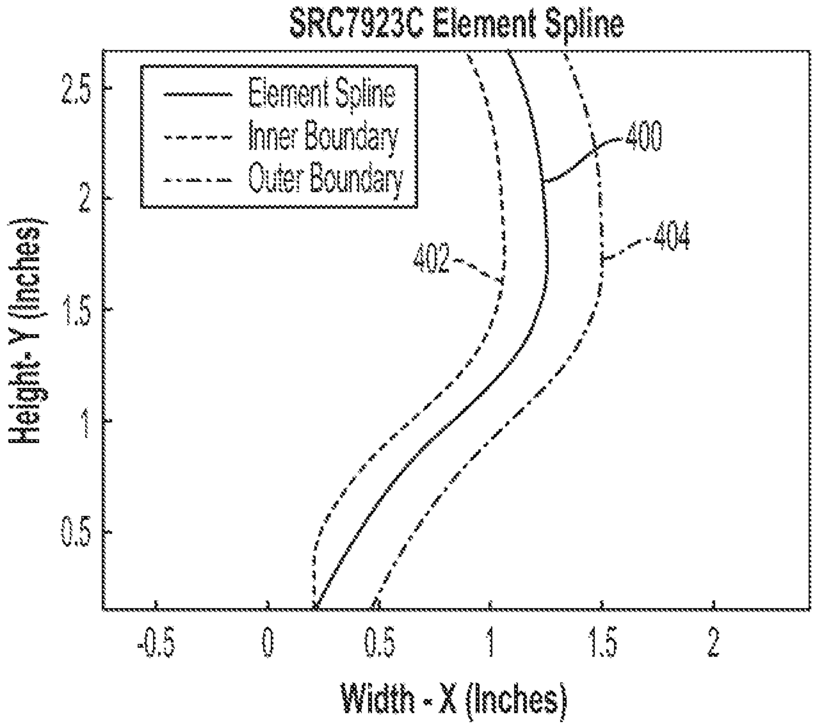
FIG. 4A depicts a plot of a range of potential curves of the radiating element, according to an example.

FIG. 4A depicts the curve 400 of the outer surface of radiating element 304. Curve 400 is rotated about the Y-axis (i.e., longitudinal axis B-B) to form the outer surface of radiating element 304 and is defined by a polynomial having the following coefficients:

[−1.7632*e*+07,3.7703*e*+06,−2.9922*e*+05,1.0539*e*+04,−158.8708,1.5534,0.0011]

Similar to the example described in connection with FIG. 2A, curve 400 results in optimized performance in the frequency range of interest—a VSWR of 2:1 from 750-6,000 MHz—but variations of curve 400 result in acceptable performance, i.e., a VSWR of at least 3:1, within the same frequency band. Multiple variations of curve 400 are shown in FIG. 4A, defined between inner boundary 402 and outer boundary 404. These examples, when paired with a suitably shaped ground plane (e.g., a suitable ground plane from the set of ground planes defined in connection with FIG. 4B), result in a VSWR of at least 3:1 over at least the bandwidth of 750-6,000 MHz.

Inner boundary can be defined by the polynomial coefficients:

[−1.8260*e*+07,3.8143*e*+06,−2.9036*e*+05,9.2911*e*+03,−99.4808,0.3379,0.0052]

And the outer boundary coefficients can be defined by the following coefficients:

[−1.7632*e*+07,3.7703*e*+06,−2.9922*e*+05,1.0539*e*+04,−158.8708,1.5534,0.0075]

Figure 4B:
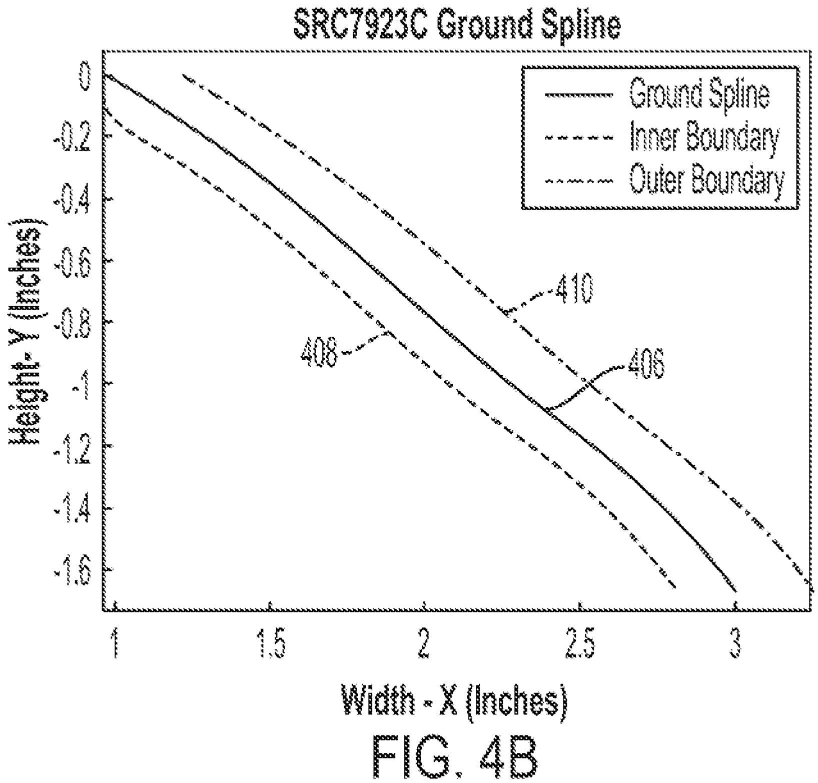
FIG. 4B depicts a plot of a range of potential curves of the ground plane, according to an example.

FIG. 4B depicts the curve 406 of the outer surface of ground plane 306. Curve 406 is rotated about the Y-axis (i.e., longitudinal axis B-B) to form the outer surface of ground plane 306 and is defined by a polynomial having the following coefficients:

[−6.0187*e*+05,−2.2295*e*+05,7.3559*e*+04,−7.2884*e*+03,325.5185,−7.4394,0.0697]

As shown, curve 406, in various alternative examples, can be defined between inner boundary 408 and outer boundary 410. Inner boundary can be defined by the polynomial coefficients:

[5.3043*e*+07,−1.6244*e*+07,2.0181*e*+06,−1.2998*e*+05,4.5683*e*+03,−83.7362,0.6242]

And the outer boundary coefficients can be defined by the following coefficients:

[−6.0187*e*+05,−2.0001*e*+05,8.0273*e*+04,−9.2436*e*+03,482.7150,−12.5322,0.1321]

Figure 5:
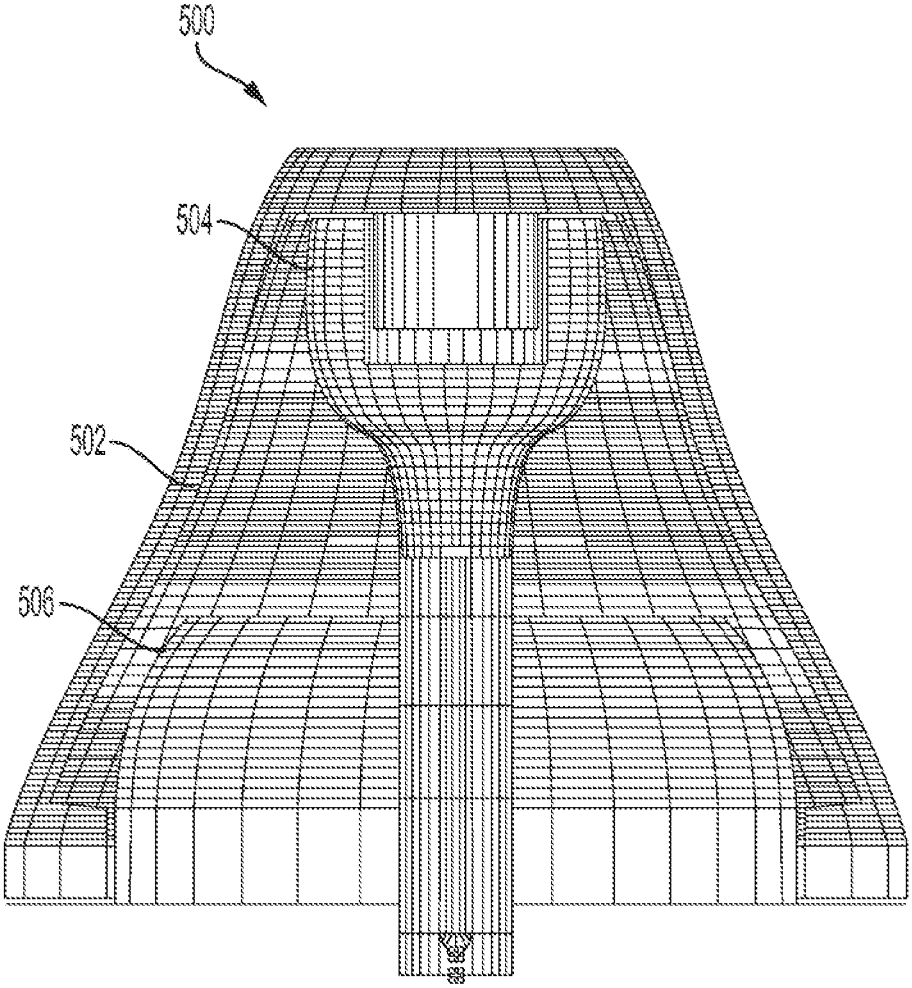
FIG. 5 depicts a three-dimensional model of a monopole antenna having a radiating element and a ground plane that each have a rotationally symmetric curved surface, according to an example.

FIG. 5 shows yet another example of a monopole antenna 500 featuring rotationally symmetric curved outer surfaces. More particularly, a perspective view of a monopole antenna 500 disposed beneath a radome 502 is shown. Similar to monopole antennas 100 and 300, monopole antenna 500 comprises a radiating element 504 and a ground plane 506, each of which includes a curved surface that is rotated about a longitudinal axis C-C extending through the center (when viewed from above) of monopole antenna 500.

Similar to the above examples, the curved outer surface of monopole antenna 500, rotationally symmetric about the longitudinal axis, enables the monopole antenna to maintain consistent patterns in azimuth, that is, to be omni-directional. In this example, the curved outer surface of radiating element 504 widens along to the longitudinal axis to substantially follow a truncated hyperboloid (at the bottom) joined to a truncated circular paraboloid (at the top). (Similar to the example of FIG. 3) The top of the radiating element 504, thus, has a diameter greater than its bottom. Similarly, ground plane 506 widens along the longitudinal axis to substantially follow a truncated circular paraboloid, such that bottom of the ground plane 506 has a diameter greater than its top.

Again, as a result of the shape of the outer surfaces of radiating element 504 and ground plane 506, monopole antenna 500 is omni-directional (i.e., has 360° azimuth coverage), and features elevation coverage of −10 to 50°. Further, monopole antenna 100 features a VSWR of 2:1 from 9,000-10,000 MHz and can transmit up to a 100 W continuous wave drive signal at X-band (depending on the type of connector used, as described above in connection with FIG. 7).

Figure 6A:
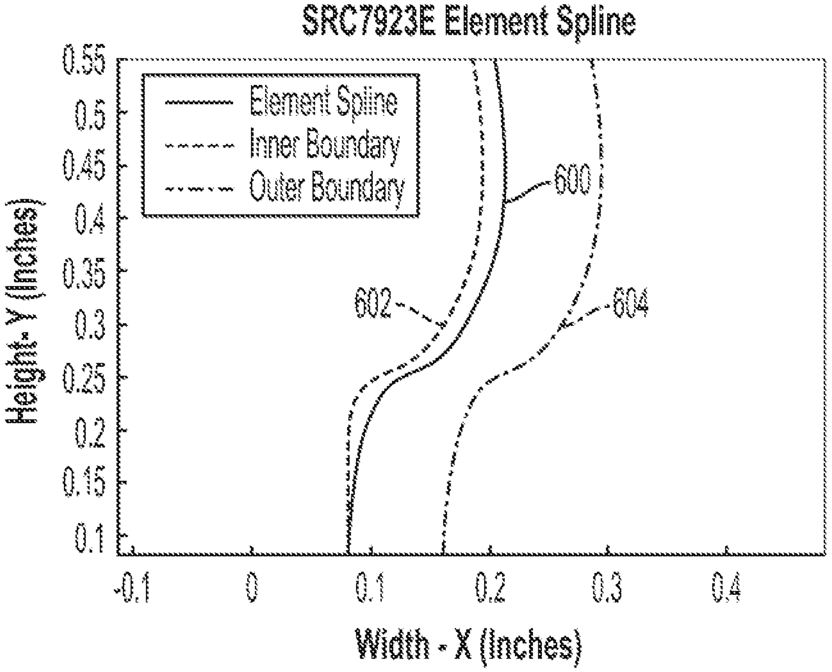
FIG. 6A depicts a plot of a range of potential curves of the radiating element, according to an example.

FIG. 6A depicts the curve 600 of the outer surface of radiating element 504. Curve 600 is rotated about the Y-axis (i.e., longitudinal axis C-C) to form the outer surface of radiating element 504 and is defined by a polynomial having the following coefficients:

[−4.55837*e*+35,5.95256*e*+34,−3.57631*e*+33,1.31063*e*+32,−3.27491*e*+30,5.90803*e*+28,−7.94838*e*+26,8.12229*e*+24,−6.36155*e*+22,3.82569*e*+20,−1.75806*e*+18,6.10036*e*+15,−1.56504*e*+13,2.86693*e*+10,−3.53408*e*+07,2.61809*e*+04,−8.77787*e*+00]

Curve 600 results in optimized performance in the frequency range of interest—a VSWR of 2:1 from 9,000-10,000 MHz—but variations of curve 600 result in acceptable performance, i.e., a VSWR of at least 2:1, within the same frequency band. Multiple variations of curve 600 are shown in FIG. 6A, defined between inner boundary 602 and outer boundary 604. These examples, when paired with a suitably shaped ground plane (e.g., a suitable ground plane from the set of ground planes defined in connection with FIG. 6B), result in a VSWR of at least 3:1 over at least the bandwidth of 9,000-10,000 MHz.

Inner boundary can be defined by the polynomial coefficients:

[−4.93500*e*+35,6.42410*e*+34,−3.84685*e*+33,1.40487*e*+32,−3.49753*e*+30,6.28527*e*+28,−8.42139*e*+26,8.56859*e*+24,−6.68061*e*+22,3.99837*e*+20,−1.82823*e*+18,6.31088*e*+15,−1.61039*e*+13,2.93397*e*+10,−3.59697*e*+07,2.65028*e*+04,−8.83888*e*+00]

And the outer boundary coefficients can be defined by the following coefficients:

[−4.55838*e*+35,5.95257*e*+34,−3.57632*e*+33,1.31063*e*+32,−3.27491*e*+30,5.90804*e*+28,−7.94839*e*+26,8.12231*e*+24−6.36156*e*+22,3.82570*e*+20,−1.75807*e*+18,6.10037*e*+15,−1.56504*e*+13,2.86694*e*+10,−3.53409*e*+07,2.61810*e*+04,−8.77586*e*+00]

Figure 6B:
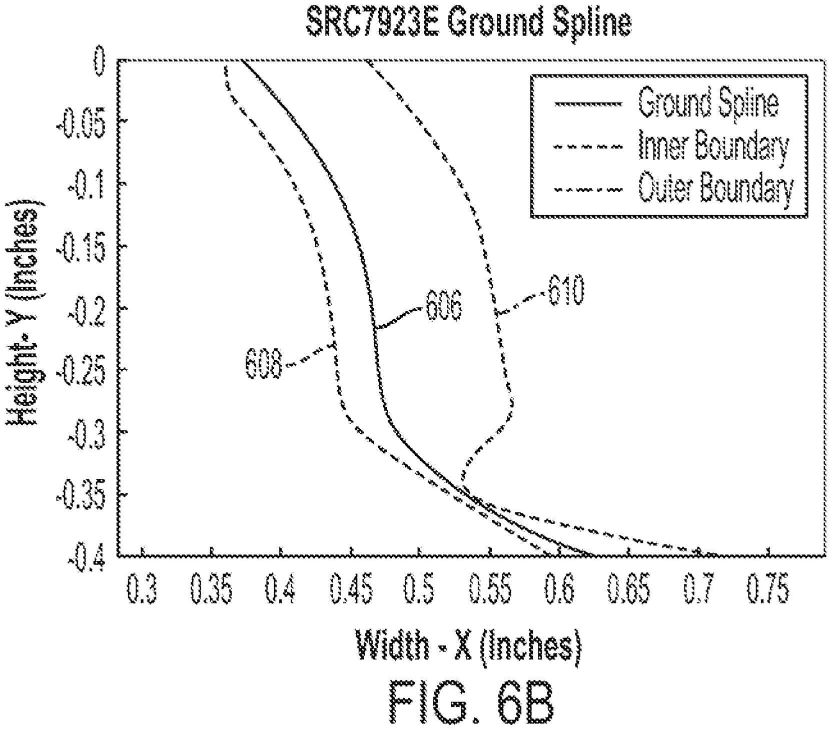
FIG. 6B depicts a plot of a range of potential curves of the ground plane, according to an example.

FIG. 6B depicts the curve 606 of the outer surface of ground plane 506. Curve 606 is rotated about the Y-axis (i.e., longitudinal axis C-C) to form the outer surface of ground plane 506 and is defined by a polynomial having the following coefficients:

[−5.1635*e*+10,−1.5511*e*+09,−1.5377*e*+07,−6.8894*e*+04,−223.2867,−0.9833,0.0094]

As shown, curve 206, in various alternative examples, can be defined between inner boundary 208 and outer boundary 210. Inner boundary can be defined by the polynomial coefficients:

[−8.4064*e*+10,−1.7844*e*+09,−8.1603*e*+06,3.3145*e*+04,247.4060,−0.1378,0.0094]

And the outer boundary coefficients can be defined by the following coefficients:

[3.1457*e*+11,7.6263*e*+09,6.7617*e*+07,2.6504*e*+05,364.4879,−0.6138,0.0115]

For the purposes of this disclosure, with respect to the above examples, it should be understood that not all curves between an inner boundary and an outer boundary will result in good performance across the frequency range of interest. Indeed, not all potential curves between the inner boundary and outer boundary will result in good performance. Thus, only those curves existing between inner boundary and outer boundary that result in a monopole antenna exhibiting a VSWR of at least 3:1 are considered acceptable. It would be understood that these curves are typically a smoothly varying curve, defined by a polynomial having an order less than or equal to nine and that is a monotonically increasing function in the vertical dimension (Z dimension in the figures).

In alternative examples, each of the above-described antennas can be only partially rotationally symmetric (i.e., the curved surface is not rotated fully about the longitudinal axis). These examples will not be as omni-directional as the above examples, however. Further, in alternative examples, the monopole antennas can be scaled down or up in size.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A monopole antenna, comprising:

a radiating element, wherein the radiating element has a first curved outer surface that is rotationally symmetric about a longitudinal axis extending through the monopole antenna, wherein a first diameter at a first end of the radiating element is less than a second diameter at a second end of the radiating element;

wherein the first curved outer surface is defined, across height, by a first polynomial existing between an inner boundary and an outer boundary, wherein the inner boundary is defined by a second polynomial having the coefficients:

[−3.3697*e*+05,1.2311*e*+05,−1.6052*e*+04,846.7565,−17.8756,1.1249−0.0091], wherein the outer boundary is defined a third polynomial having the coefficients:

[−3.3697*e*+05,1.2311*e*+05,−1.6052*e*+04,846.7565,−17.8756,1.1249,0.0062], and wherein the predetermined bandwidth is at least 350-6,000 MHz; and a ground plane disposed opposite the radiating element such that an electric field is generated by the radiating element using the ground plane as a counterpoise, wherein the ground plane has a second curved outer surface that is rotationally symmetric about the longitudinal axis, wherein a first diameter at a first end of the ground plane is less than a second at a second end of the ground plane, wherein the first end of the radiating element is disposed adjacent the first end of the ground plane.

2. The monopole antenna of claim 1, wherein the first polynomial has the coefficients:

[−3.3697*e*+05,1.2311*e*+05,−1.6052*e*+04,846.7565,−17.8756,1.1249,0.0024].

3. The monopole antenna of claim 1, wherein, the second curved outer surface is defined, across height, by a fourth polynomial existing between a second inner boundary and a second outer boundary, wherein the second inner boundary is defined by a fifth polynomial having the coefficients:

[−1.6988*e*+05,6.8727*e*+04,−1.0044*e*+04,626.0154,−16.5014,−0.1925,0.0096], wherein the second outer boundary is defined a sixth polynomial having the coefficients:

[5.6431*e*+04,−6.3725*e*+04,1.9482*e*+04,−2.6004*e*+03,166.6723,−5.4307,0.0656].

4. The monopole antenna of claim 3, wherein the fourth polynomial has the coefficients:

[−1.6988*e*+05,7.2610*e*+04,−1.1390*e*+04,789.2496,−24.5701,−0.0372,0.0100].

5. A monopole antenna, comprising: a radiating element, wherein the radiating element has a first curved outer surface that is rotationally symmetric about a longitudinal axis extending through the monopole antenna, wherein a first diameter at a first end of the radiating element is less than a second diameter at a second end of the radiating element;

the first curved outer surface is defined, across height, by a first polynomial existing between an inner boundary and an outer boundary, wherein the inner boundary is defined by a second polynomial having the coefficients:

[−1.8260*e*+07,3.8143*e*+06,−2.9036*e*+05,9.2911*e*+03,−99.4808,0.3379,0.0052]

wherein the outer boundary is defined a third polynomial having the coefficients:

[−1.7632e+07,3.7703e+06,−2.9922e+05,1.0539e+04,−158.8708,1.5534,0.0075]

wherein the predetermined bandwidth is at least 750-6,000 MHz; and a ground plane disposed opposite the radiating element such that an electric field is generated by the radiating element using the ground plane as a counterpoise, wherein the ground plane has a second curved outer surface that is rotationally symmetric about the longitudinal axis, wherein a first diameter at a first end of the ground plane is less than a second at a second end of the ground plane, wherein the first end of the radiating element is disposed adjacent the first end of the ground plane.

6. The monopole antenna of claim 5, wherein the first polynomial has the coefficients:

[−1.7632e+07,3.7703e+06,−2.9922e+05,1.0539e+04,−158.8708,1.5534,0.0011].

7. The monopole antenna of claim 5, wherein, the second curved outer surface is defined, across height, by a fourth polynomial existing between a second inner boundary and a second outer boundary, wherein the second inner boundary is defined by a fifth polynomial having the coefficients:

[5.3043e+07,−1.6244e+07,2.0181e+06,−1.2998e+05,4.5683e+03,−83.7362,0.6242]

wherein the second outer boundary is defined a sixth polynomial having the coefficients:

[−6.0187e+05,−2.0001e+05,8.0273e+04,−9.2436e+03,482.7150,−12.5322,0.1321].

8. The monopole antenna of claim 7, wherein the fourth polynomial has the coefficients:

[−6.0187e+05,−2.2295e+05,7.3559e+04,−7.2884e+03,325.5185,−7.4394,0.0697].

9. A monopole antenna, comprising:

a radiating element, wherein the radiating element has a first curved outer surface that is rotationally symmetric about a longitudinal axis extending through the monopole antenna, wherein a first diameter at a first end of the radiating element is less than a second diameter at a second end of the radiating element;

wherein, the first curved outer surface is defined, across height, by a first polynomial existing between an inner boundary and an outer boundary, wherein the inner boundary is defined by a second polynomial having the coefficients:

[−4.93500e+35,6.42410e+34,−3.84685e+33,1.40487e+32,−3.49753e+30,6.28527e+28,−8.42139e+26,8.56859e+24,−6.68061e+22,3.99837e+20,−1.82823e+18,6.31088e+15,−1.61039e+13,2.93397e+10,−3.59697e+07,2.65028e+04,−8.83888e+00]

wherein the outer boundary is defined a third polynomial having the coefficients:

[−4.55838e+35,5.95257e+34,−3.57632e+33,1.31063e+32,−3.27491e+30,5.90804e+28,−7.94839e+26,8.12231e+24,−6.36156e+22,3.82570e+20,−1.75807e+18,6.10037e+15,−1.56504e+13,2.8669e+10,−3.534904e+07,2.61810e+04,−8.7756e+00]

wherein the predetermined bandwidth is at least 9,000-10,000 MHz; and a ground plane disposed opposite the radiating element such that an electric field is generated by the radiating element using the ground plane as a counterpoise, wherein the ground plane has a second curved outer surface that is rotationally symmetric about the longitudinal axis, wherein a first diameter at a first end of the ground plane is less than a second at a second end of the ground plane, wherein the first end of the radiating element is disposed adjacent the first end of the ground plane.

10. The monopole antenna of claim 9, wherein the first polynomial has the coefficients:

[−4.55837e+35,5.95256e+34,−3.57631e+33,1.31063e+32,−3.27491e+30,5.90803e+28,−7.94838e+26,8.12229e+24,−6.36155e+22,3.82569e+20,−1.75806e+18,6.10036e+15,−1.56504e+13,2.86693e+10,−3.53408e+07,2.61809e+04,−8.77787e+00].

11. The monopole antenna of claim 9, wherein, the second curved outer surface is defined, across height, by a fourth polynomial existing between a second inner boundary and a second outer boundary, wherein the second inner boundary is defined by a fifth polynomial having the coefficients:

[−8.4064e+10,−1.7844e+09,−8.1603e+06,3.3145e+04,247.4060,−0.1378,0.0094]

wherein the second outer boundary is defined a sixth polynomial having the coefficients:

[3.1457e+11,7.6263e+09,6.7617e+07,2.6504e+05,364.4879,−0.6138,0.0115].

12. The monopole antenna of claim 11, wherein the fourth polynomial has the coefficients:

[−5.1635e+10,−1.5511e+09,−1.5377e+07,−6.8894e+04,−223.2867,−0.9833,0.0094].

* * * * *